(12) United States Patent
Ootani (10) Patent No.: US 11,305,734 B2
(45) Date of Patent: Apr. 19, 2022

(54) WIPER DEVICE

(71) Applicant: DENSO CORPORATION, Kariya (JP)

(72) Inventor: Hiromu Ootani, Kariya (JP)

(73) Assignee: DENSO CORPORATION, Kariya (JP)

(*) Notice: Subject to any disclaimer, the term of this patent is extended or adjusted under 35 U.S.C. 154(b) by 238 days.

(21) Appl. No.: 16/381,110

(22) Filed: Apr. 11, 2019

(65) Prior Publication Data

US 2019/0322244 A1 Oct. 24, 2019

(30) Foreign Application Priority Data

Apr. 20, 2018 (JP) .............................. JP2018-081581

(51) Int. Cl.
| | | |
|---|---|---|
| *B60S 1/16* | (2006.01) | |
| *B60S 1/08* | (2006.01) | |
| *B60S 1/18* | (2006.01) | |

(52) U.S. Cl.
CPC ................. *B60S 1/163* (2013.01); *B60S 1/08* (2013.01); *B60S 1/18* (2013.01)

(58) Field of Classification Search
CPC .... B60S 1/163; B60S 1/08; B60S 1/18; H02P 7/00; H02P 5/00
USPC ............... 15/250.12; 318/282, 443, 444, 445
See application file for complete search history.

(56) References Cited

U.S. PATENT DOCUMENTS

| | | | | |
|---|---|---|---|---|
| 6,249,098 B1* | 6/2001 | Miyazaki | ................. | B60S 1/08 15/250.12 |
| 2010/0139025 A1* | 6/2010 | Natsume | ............... | B60S 1/0896 15/250.31 |

FOREIGN PATENT DOCUMENTS

| | | | |
|---|---|---|---|
| JP | 2010-159044 A | | 7/2010 |
| JP | 4691165 B2 | | 6/2011 |
| JP | 2013052826 A | * | 3/2013 |
| JP | 5766072 B2 | | 8/2015 |

* cited by examiner

*Primary Examiner* — Katina N. Henson
(74) *Attorney, Agent, or Firm* — Oliff PLC (57) ABSTRACT

A wiper device that includes: a first control section that, during intermittent operation, controls power supply to a drive source such that a wiper blade wipes to-and-fro between a first return position and a second return position on a windshield and stops moving for a predetermined duration at the first return position, and that performs position retention control that controls power supply to the drive source such that the stopped wiper blade is retained at a position at which the wiper blade is stopped; and a second control section that suspends the position retention control by the first control section in a case in which a current flowing in the drive source is detected to have increased by a predetermined value or greater while the wiper blade moves toward the first return position within a predetermined region in a vicinity of the first return position.

5 Claims, 10 Drawing Sheets

WIPER DEVICE

CROSS-REFERENCE TO RELATED APPLICATION

This application is based on and claims priority under 35 USC 119 from Japanese Patent Application No. 2018-081581 filed on Apr. 20, 2018, the disclosure of which is incorporated by reference herein.

BACKGROUND

Technical Field

The present disclosure relates to a wiper device.

Related Art

Japanese Patent Application Laid-Open (JP-A) No. 2010-159044 discloses performing what is referred to as position retention control, in which rotation force of a wiper motor is controlled such that a wiper is applied with downward rotation force to maintain the wiper at a lower return position in cases in which the wiper has been stopped at the lower return position. In this position retention control, the wiper that has been stopped at the lower return position is suppressed from being pushed upward from the lower return position by pressure from travel-induced wind.

However, if an obstruction is present within a wiping range just before the lower return position, the obstruction causes a wiper blade moving toward the lower return position to arrive at the lower return position in a state in which the wiper blade, a wiper arm, and a link mechanism are flexed. If position retention control is performed in a state in which the wiper blade, the wiper arm, and the link mechanism are flexed, excessive load is placed on the wiper motor, causing a large current to flow, which could lead to premature deterioration or faults in the wiper motor. There is also the potential for faults caused by placing an excessive load on the wiper blade, the wiper arm, and the link mechanism.

SUMMARY

An aspect of the present disclosure is a wiper device that includes: a drive source that generates drive force by being supplied with power; a wiper arm to which drive force of the drive source is transmitted by the wiper arm being coupled with a wiper blade; a first control section that, during intermittent operation, controls power supply to the drive source such that the wiper blade wipes to-and-fro between a first return position and a second return position on a windshield and stops moving for a predetermined duration at the first return position, and that performs position retention control that controls power supply to the drive source such that the stopped wiper blade is retained at a position at which the wiper blade is stopped; and a second control section that suspends the position retention control by the first control section in a case in which a current flowing in the drive source is detected to have increased by a predetermined value or greater while the wiper blade moves toward the first return position within a predetermined region in a vicinity of the first return position.

DETAILED DESCRIPTION

Detailed explanation follows regarding an example of exemplary embodiments of the present invention, with reference to the drawings.

First Exemplary Embodiment

Figure 1:
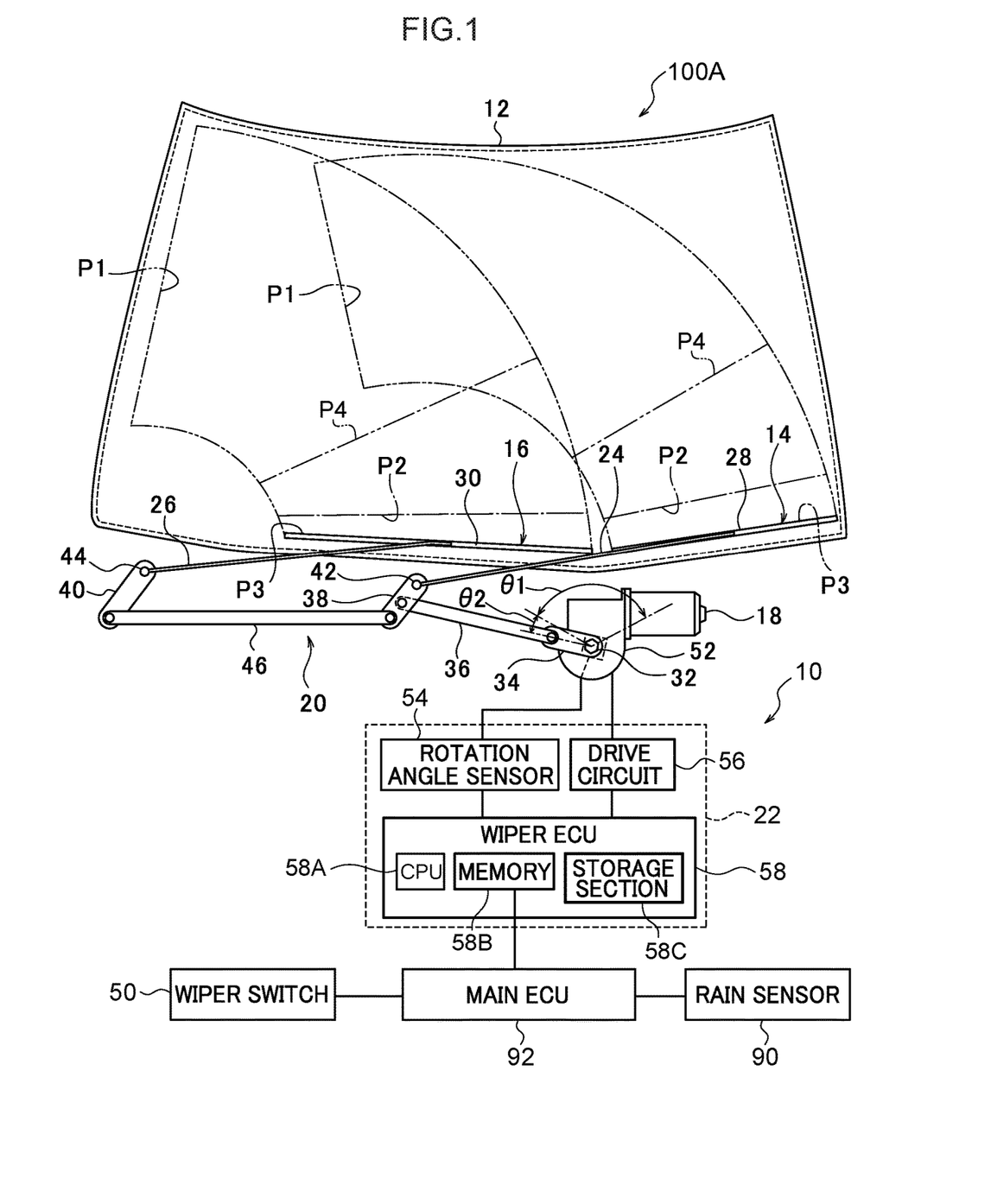
FIG. 1 is a schematic view illustrating configuration of a wiper device according to a first exemplary embodiment.

As illustrated in FIG. 1, a wiper device 100A according to a first exemplary embodiment is, for example, a device for wiping a windshield glass 12 of a vehicle such as a passenger car. The wiper device 100A includes a pair of wipers 14, 16, a wiper motor 18, a link mechanism 20, and a wiper control device 10. In the present exemplary embodiment, the wiper motor 18 is a brushed DC motor.

The wiper 14 includes a wiper arm 24 that has a base end portion fixed to a pivot shaft 42, and a wiper blade 28 coupled to a leading end portion of the wiper arm 24. The wiper 16 includes a wiper arm 26 that has a base end portion fixed to a pivot shaft 44, and a wiper blade 30 coupled to a leading end portion of the wiper arm 26. The wiper arms 24, 26 of the wipers 14, 16 pivot about the pivot shafts 42, 44 such that the wiper blades 28, 30 move to-and-fro over the windshield glass 12. The wiper blades 28, 30 thus wipe the windshield glass 12.

The wiper motor 18 includes an output shaft 32 that is capable of rotating forward and in reverse at a speed reduced by a speed reduction mechanism 52 configured mainly by a worm gear. The link mechanism 20 includes a crank arm 34, a first link rod 36, a pair of pivot levers 38, 40, the pair of pivot shafts 42, 44, and a second link rod 46.

One end side of the crank arm 34 is fixed to the output shaft 32 of the wiper motor 18, and the other end side of the crank arm 34 is pivotally coupled to one end side of the first link rod 36. The other end side of the first link rod 36 is pivotally coupled to an intermediate portion of the pivot lever 38. One end portion of the second link rod 46 is pivotally coupled to an end portion of the pivot lever 38 on the opposite side to the end portion fixed to the pivot shaft 42, and the other end portion of the second link rod 46 is pivotally coupled to an end portion of the pivot lever 40 on the opposite side to the end portion fixed to the pivot shaft 44.

The pivot shafts 42, 44 are pivotally supported by pivot holders provided on the vehicle body. The wiper arms 24, 26 are coupled, via the pivot shafts 42, 44, to the ends of the pivot levers 38, 40 on the side to which the pivot shafts 42, 44 are fixed.

In the wiper device 100A according to the first exemplary embodiment, when the output shaft 32 of the wiper motor 18 is rotated forward or in reverse through a predetermined rotation angle range $\theta 1$, rotation force of the output shaft 32 is transmitted to the wiper arms 24, 26 through the link mechanism 20, and the wiper blades 28, 30 move to-and-fro over the windshield glass 12 between a lower return position P2 and an upper return position P1 accompanying the to-and-fro pivoting of the wiper arms 24, 26. Various values may be employed as the value of the rotation angle range $\theta 1$ according to the configuration of the link mechanism of the wiper device 100A and the like, and as an example, $\theta 1 = 140°$.

In the present exemplary embodiment, a stowed position P3 is provided below the lower return position P2. The wiper blades 28, 30 are moved to the stowed position P3 by rotating the output shaft 32 through a rotation angle $\theta 2$ from a state in which the wiper blades 28, 30 are at the lower return position P2. Various values may be employed as the rotation angle $\theta 2$ according to the configuration of the link mechanism of the wiper device 100 and the like, and as an example, $\theta 2 = 10°$.

In the first exemplary embodiment, as illustrated in FIG. 1, when the wiper blades 28, 30 are positioned at the stowed position P3, the crank arm 34 and the first link rod 36 form a linear shape. When the crank arm 34 and the first link rod 36 form a linear shape, a predetermined position retention force acts on the wiper blades 28, 30 positioned at the stowed position P3, such that the wiper blades 28, 30 are maintained in a state positioned at the stowed position P3, even if applied with a small external force. Note that if the rotation angle $\theta 2 = 0°$, the lower return position P2 and the stowed position P3 are aligned with each other, and the wiper blades 28, 30 are stopped and stowed at the lower return position P2.

The wiper control device 10 includes a wiper control section 22 to control rotation of the wiper motor 18. The wiper control section 22 is connected to the wiper motor 18. The wiper control section 22 includes a wiper Electronic Control Unit (ECU) 58, a drive circuit 56, and a rotation angle sensor 54.

The wiper ECU 58 includes a CPU 58A, memory 58B and a non-volatile storage section 58C. The wiper ECU 58 computes the position of the wiper blades 28, 30 on the windshield glass 12 and the rotation speed of the output shaft 32 based on the rotation speed of the output shaft 32 of the wiper motor 18 and detection results from the rotation angle sensor 54 that detects the rotation angle, and controls the drive circuit 56 so as to change the rotation speed of the output shaft 32 according to the computed position. The rotation angle sensor 54 is provided inside the speed reduction mechanism 52 of the wiper motor 18, and detects by converting a magnetic field (magnetic force) of a sensor magnet that rotates coupled to the output shaft 32 into a current.

In the present exemplary embodiment, since the speed of the output shaft 32 of the wiper motor 18 is reduced by the speed reduction mechanism 52, the rotation speed and rotation angle of the output shaft 32 are not the same as the rotation speed and rotation angle of a wiper motor main body. However, in the present exemplary embodiment the wiper motor main body and the speed reduction mechanism 52 are configured as an inseparable single body, and so hereinafter the rotation speed and rotation angle of the output shaft 32 are taken as being synonymous with the rotation speed and rotation angle of the wiper motor 18. Note that data relating to control of the drive circuit 56 is stored in the storage section 58C in advance.

A wiper switch 50 is connected to the wiper ECU 58 of the wiper control section 22 through a main ECU 92 that controls a vehicle engine and the like. The wiper switch 50 switches power supply from a vehicle battery to the wiper motor 18 ON and OFF. A rain sensor 90, serving as a raindrop detection section, is connected to the wiper ECU 58 of the wiper control section 22 through the main ECU 92.

A contact point of the wiper switch 50 is capable of switching between a low speed operation position (LOW) for low speed operation of the wiper blades 28, 30, a high speed operation position (HIGH) for high speed operation of the wiper blades 28, 30, an intermittent operation position (INT) for intermittent operation of the wiper blades 28, 30 in a fixed cycle, an automatic operation position (AUTO) for operating the wiper blades 28, 30 when raindrops have been detected by the rain sensor 90, and a stationary position (OFF). The main ECU 92 detects the position of the contact point of the wiper switch 50, and outputs a detection result as a command signal to the wiper ECU 58 via a signal input circuit 62 (FIG. 2).

The rain sensor 90 is, for example, a type of optical sensor provided on a vehicle cabin inner side of the windshield glass 12, and detects water droplets and the like present on the surface of the windshield glass 12. As an example, the rain sensor 90 includes an LED configuring an infrared radiation emitting element, a photodiode configuring an infrared radiation receiving element, a lens that forms an optical path of infrared radiation, and a control circuit. Infrared radiation emitted toward the vehicle exterior from the vehicle cabin side by the LED is completely reflected by the windshield glass 12 when the surface of the windshield glass 12 is dry, but if water droplets are present on the surface of the windshield glass 12, some of the infrared radiation passes through the water droplets and escapes to the exterior, reducing the rate of reflection by the windshield glass 12. The amount of the infrared radiation incident to the photodiode configuring the infrared radiation receiving element therefore decreases. The control circuit detects water droplets present on the surface of the windshield glass 12 based on this decrease in the amount of infrared radiation. Note that although the rain sensor 90 employing infrared radiation is provided as a raindrop detection section in the present exemplary embodiment, there is no limitation thereto. For example, an onboard camera may be provided separately to the rain sensor 90 that employs infrared radiation.

The wiper ECU 58 rotates the wiper motor 18 at high speed when the contact point position of the wiper switch 50 input as a command signal is at the high speed operation position, and rotates the wiper motor 18 at low speed when the contact point position of the wiper switch 50 input as a command signal is at the low speed operation position. When the contact point position of the wiper switch 50 input as a command signal is the intermittent operation position, the wiper ECU 58 rotates the wiper motor 18 intermittently such that the wiper blades 28, 30 wipe to-and-fro between the upper return position P1 and the lower return position P2 and stop at the lower return position P2 for a predetermined duration. When the contact point position of the wiper switch 50 input as a command signal is the automatic operation position, the wiper ECU 58 controls the rotation speed of the wiper motor 18 based on signals output according to the quantity of raindrops detected by the rain sensor 90.

Figure 2:
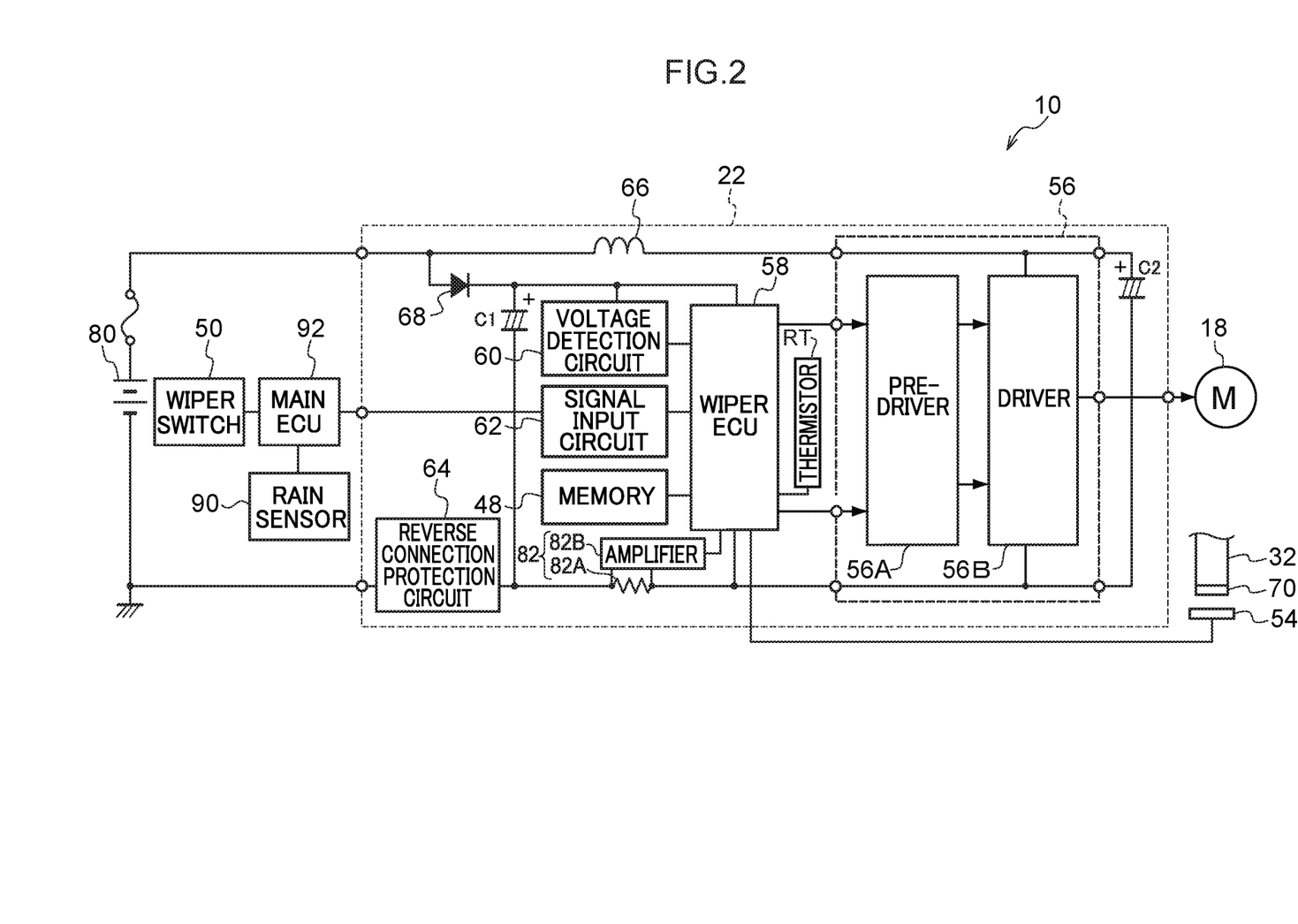
FIG. 2 is a block diagram schematically illustrating an example of configuration of a wiper control device.

As illustrated in FIG. 2, power of a battery 80 is supplied to the wiper ECU 58 through a diode 68, and the voltage of the power supplied from the battery 80 is detected by a voltage detection circuit 60 provided between the diode 68 and the wiper ECU 58, with the detection result being output to the wiper ECU 58.

One terminal (the + terminal) of an electrolytic capacitor C1 is connected between the diode 68 and the wiper ECU 58 and the other terminal (the − terminal) of the electrolytic capacitor C1 is grounded. The electrolytic capacitor C1 is a capacitor employed to stabilize the power source of the wiper ECU 58. For example, the electrolytic capacitor C1 protects the wiper ECU 58 by accumulating sudden high voltages such as surges and discharging to ground.

The rotation angle sensor 54 for detecting the magnetic field of a sensor magnet 70 as it changes according to rotation of the output shaft 32 is connected to the wiper ECU 58. The wiper ECU 58 detects the position of the wiper blades 28, 30 on the windshield glass 12 by computing the rotation angle of the output shaft 32 based on the signal output by the rotation angle sensor 54.

Furthermore, the wiper ECU 58 references data pre-stored in the storage section 58C relating to rotation speeds of the wiper motor 18 specified according to the positions of the wiper blades 28, 30. The wiper ECU 58 then controls the drive circuit 56 such that the rotation of the wiper motor 18 becomes a rotation speed corresponding to the identified position of the wiper blades 28, 30.

The drive circuit 56 includes a pre-driver 56A that generates a drive signal to turn switching elements of a driver 56B ON and OFF based on a control signal input from the wiper ECU 58, and the driver 56B that passes current through a coil of the wiper motor 18 by turning the switching elements ON and OFF in accordance with the drive signal output by the pre-driver 56A. The driver 56B is, for example, configured by four FETs.

A reverse connection protection circuit 64 and a noise prevention coil 66 are provided between the drive circuit 56 and the battery 80 serving as the power source, and an electrolytic capacitor C2 is connected in parallel to the drive circuit 56. The noise prevention coil 66 suppresses noise generated by switching of the drive circuit 56. The electrolytic capacitor C2 alleviates noise generated by the drive circuit 56, and accumulates sudden high voltages such as surges and discharging to ground, thereby preventing excessive current from being input to the drive circuit 56.

The reverse connection protection circuit 64 is a circuit for protecting elements configuring the wiper control device 10 if the positive electrode and the negative electrode of the battery 80 are connected in the opposite manner to that illustrated in FIG. 2. As an example, the reverse connection protection circuit 64 is configured by what is referred to as a diode-connected FET in which the drain and the gate of the FET are connected to each other.

A chip thermistor RT that detects a substrate temperature as a resistance value is provided on a substrate of the wiper control device 10. The chip thermistor RT configures a type of voltage divider, and a voltage that changes based on the resistance value of the chip thermistor RT is output from an output terminal of the voltage divider configured by the chip thermistor RT. The wiper ECU 58 computes the temperature of the substrate of the wiper control device 10 based on the voltage output from the output terminal of the voltage divider configured by the chip thermistor RT. In cases in which this temperature has exceeded a predetermined threshold temperature, the wiper ECU 58 stops operation of the wiper control device 10.

A current detection section 82 that detects a current (motor current) between the coil of the wiper motor 18 and the driver 56B is provided between the battery 80 and the sources of the respective switching elements configuring the driver 56B. The current detection section 82 includes a shunt resistor 82A with a resistance value in the region of from 0.2 mΩ to several Ω, and an amplifier 82B that detects a potential difference between the two terminals of the shunt resistor 82A that changes according to the current of the driver 56B, and amplifies a signal representing the detected potential difference. The wiper ECU 58 computes a current value of the motor current using the signal output by the amplifier 82B.

Explanation follows regarding operation of the first exemplary embodiment, firstly, position retention control performed in a state in which the contact point of the wiper switch 50 has been switched to the intermittent operation position (INT) and the wiper blades 28, 30 are operating intermittently in a fixed cycle.

During the intermittent operation of the wiper blades 28, 30, the wiper ECU 58 confirms a value set as a position retention control permission flag each time the wiper blades 28, 30 stop at the lower return position P2. In cases in which a value for "permitted" has been set as the position retention control permission flag, the position retention control is performed to maintain the wiper blades 28, 30 at the lower return position P2 until the wiper blades 28, 30 start moving toward the upper return position P1.

Namely, in the position retention control, the wiper ECU 58 monitors whether or not the position of the wiper blades 28, 30 as detected by the rotation angle sensor 54 correspond to the lower return position P2. In cases in which the position of the wiper blades 28, 30 corresponds to the lower return position P2, the wiper ECU 58 does not drive the wiper motor 18. In cases in which the position of the wiper blades 28, 30 is offset above the lower return position P2, the wiper ECU 58 drives the wiper motor 18 so as to move the wiper blades 28, 30 downward to the lower return position P2. In cases in which the position of the wiper blades 28, 30 is offset below the lower return position P2, the wiper ECU 58 drives the wiper motor 18 so as to move the wiper blades 28, 30 upward to the lower return position P2.

In the position retention control, while the wiper blades 28, 30 have stopped at the lower return position P2 during intermittent operation, the wiper blades 28, 30 are maintained in a stationary state at the lower return position P2 even if external force due to travel-induced wind or the like acts on the wiper blades 28, 30. In the position retention control described above, the lower return position P2 is an example of a first return position. Note that in cases in which the position retention control permission flag has been set to a value indicating "forbidden" when the wiper blades 28, 30 have stopped at the lower return position P2, the position retention control described above is not performed. The wiper ECU 58 is thus an example of a first control section, and the position retention control permission flag is an example of instruction information.

Figure 3:
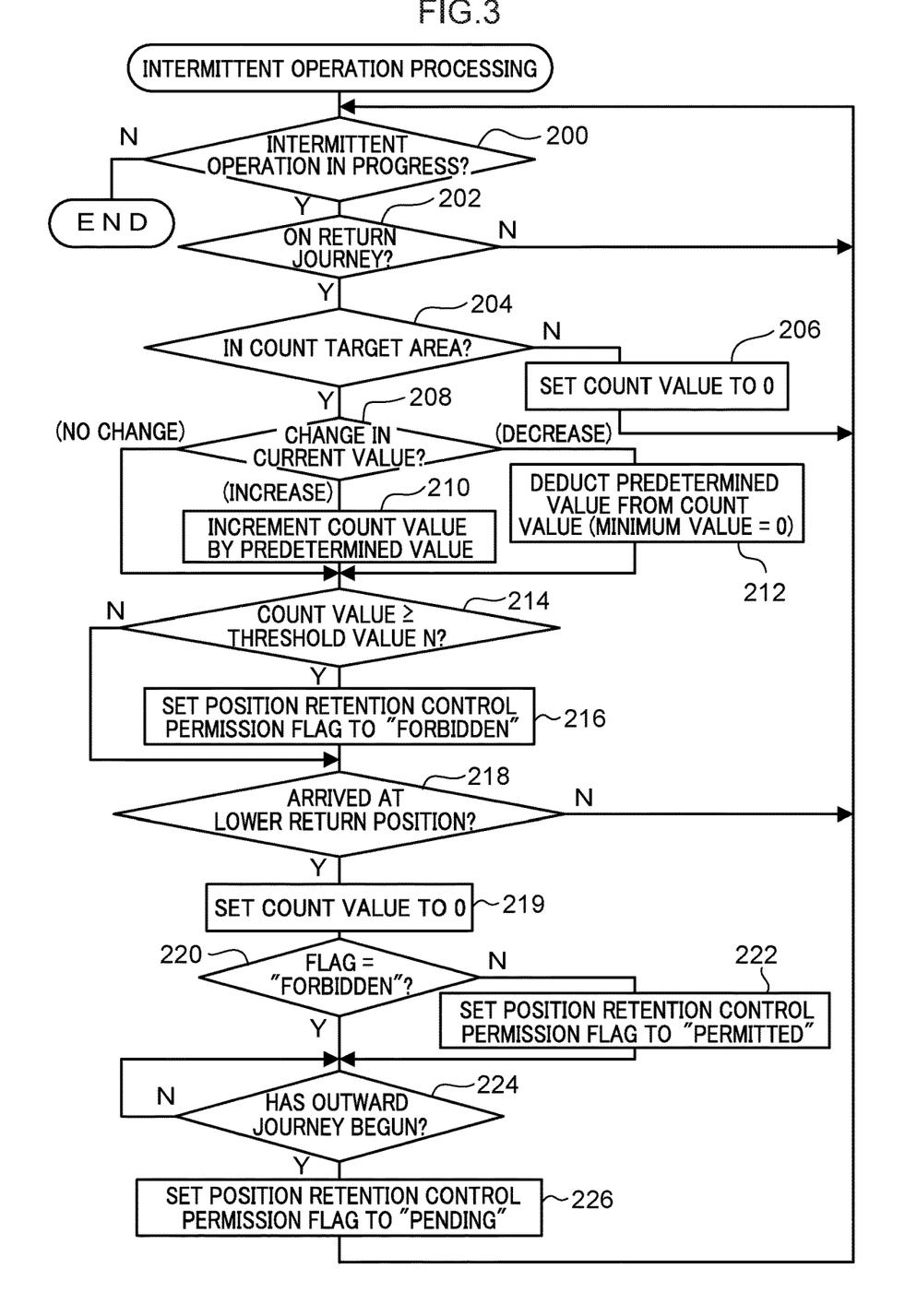
FIG. 3 is a flowchart illustrating an example of intermittent operation processing according to the first exemplary embodiment.

Next, explanation follows regarding intermittent operation processing executed by the wiper ECU 58 during intermittent operation of the wiper blades 28, 30, with reference to FIG. 3. At step 200, the wiper ECU 58 determines whether or not intermittent operation is in progress. In cases in which the contact point of the wiper switch 50 has been switched to a position other than the intermittent operation position (INT), determination is negative at step 200 and the intermittent operation processing is ended.

In cases in which the contact point of the wiper switch 50 is at the intermittent operation position (INT), determination is affirmative at step 200, and processing transitions to step 202. At step 202, the wiper ECU 58 determines whether or not a current state of the wiper device 100A is one in which the wiper blades 28, 30 are on a return journey moving from the upper return position P1 toward the lower return position P2. In cases in which the current state of the wiper device 100A is one in which the wiper blades 28, 30 are on an outward journey moving from the lower return position P2 toward the upper return position P1, determination is negative at step 202 and processing returns to step 200.

In cases in which determination is affirmative at step 202, processing transitions to step 204. At step 204, the wiper ECU 58 determines whether or not the current position of the wiper blades 28, 30 is within a count target area to be monitored for an increase in the current of the wiper motor 18. In the present exemplary embodiment, the count target area is a region with an upper end at an upper end position P4 (a position between the upper return position P1 and the lower return position P2) illustrated in FIG. 1, and with a lower end at the lower return position P2. The count target area corresponds to a range in which, if no obstruction is present within the count target area, the motor current is set to decrease monotonically. Note that the count target area of the present exemplary embodiment is an example of a predetermined region.

In cases in which the current position of the wiper blades 28, 30 is outside the count target area, determination is negative at step 204 and processing transitions to step 206, where a count value used to count an increase in the current of the wiper motor 18 is set to 0 and processing returns to step 200. In cases in which the current position of the wiper blades 28, 30 is within the count target area, determination is affirmative at step 204, and processing transitions to step 208. At step 208, the wiper ECU 58 acquires a motor current detection result from the current detection section 82, determines whether there is a change in the motor current, and takes a path according to the result of this determination.

Namely, in cases in which the motor current acquired at this stage has increased compared to the preceding acquired motor current, processing transitions from step 208 to step 210, and at step 210 the wiper ECU 58 increments the count value by a predetermined value (for example 1), and processing transitions to step 214. In cases in which the motor current acquired at this stage has decreased compared to the preceding acquired motor current, processing transitions from step 208 to step 212, and at step 212 the wiper ECU 58 deducts a predetermined value (for example 1) from the count value, and processing transitions to step 214. Note that the minimum count value is 0, and if the deduction of the predetermined value from the count value would result in a negative number, the count value is set to 0.

Note that the first time the motor current detection result is acquired in the count target area, and in cases in which the motor current detection result acquired at this stage is the same as the preceding acquired motor current detection result, processing transitions to step 214 with no change to the count value.

At step 214, the wiper ECU 58 determines whether or not the count value has reached or exceeded a threshold value N. In cases in which determination is affirmative at step 214, processing transitions to step 216. At step 216, the wiper ECU 58 sets the position retention control permission flag to a value indicating "forbidden", and processing transitions to step 218. In cases in which determination is negative at step 214, step 216 is skipped and processing transitions to step 218.

In this manner, the wiper ECU 58 increments the count value each time an increase in the motor current is detected while the wiper blades 28, 30 are moving through the count target area toward the lower return position P2, and in cases in which the count value reaches or exceeds the threshold value N, determination is made that an increase in the motor current of a predetermined value or greater has been detected. This thereby enables an increase in the motor current of the predetermined value or greater, corresponding to the wiper blades 28, 30 hitting an obstruction, to be precisely detected without being affected by momentary increases in the motor current or the like.

At step 218, the wiper ECU 58 determines whether or not the wiper blades 28, 30 have arrived at the lower return position P2. In cases in which determination is negative at step 218, processing returns to step 200, and steps 200 to 218 are repeated until determination is affirmative at step 218. When determination is affirmative at step 218, processing transitions to step 219, and the count value is set to 0.

At the next step 220, the wiper ECU 58 determines whether or not the position retention control permission flag has been set to the value indicating "forbidden". In cases in which determination is negative at step 220, processing transitions to step 222. At step 222, the wiper ECU 58 sets the position retention control permission flag to the value indicating "permitted", and processing transitions to step 224. In cases in which determination is affirmative at step 220, step 222 is skipped, and the processing transitions to step 224.

In the processing described above, in cases in which the count value reaches or exceeds the threshold value N before the wiper blades 28, 30 arrive at the lower return position P2, the position retention control permission flag is set to the value indicating "forbidden" at the point in time when the count value reaches or exceed the threshold value N. In cases in which the count value does not reach or exceed the threshold value N before the wiper blades 28, 30 arrive at the lower return position P2, the position retention control permission flag is set to the value indicating "permitted" at the point in time when the wiper blades 28, 30 arrive at the lower return position P2. Then, in cases in which the position retention control permission flag has been set to the value indicating "permitted", position retention control is performed by the wiper ECU 58, whereas in cases in which the position retention control permission flag has been set to the value indicating "forbidden", position retention control is not performed by the wiper ECU 58.

At the next step 224, the wiper ECU 58 determines whether or not the wiper blades 28, 30 have begun an outward journey. In cases in which determination is negative, step 224 is repeated until determination becomes affirmative. In cases in which the wiper blades 28, 30 have begun an outward journey and determination is affirmative at step 224, processing transitions to step 226. At step 226, the wiper ECU 58 set the position retention control permission flag to a value indicating "pending". Accordingly, in cases in which the position retention control permission flag has initially been set to "forbidden", the position retention control permission flag is maintained in the state set to "forbidden" until the next to-and-fro journey begins. After the processing of step 226 has been performed, processing returns to step 200. The wiper ECU 58 that performs the intermittent operation processing described above is an example of a second control section.

Figure 4:
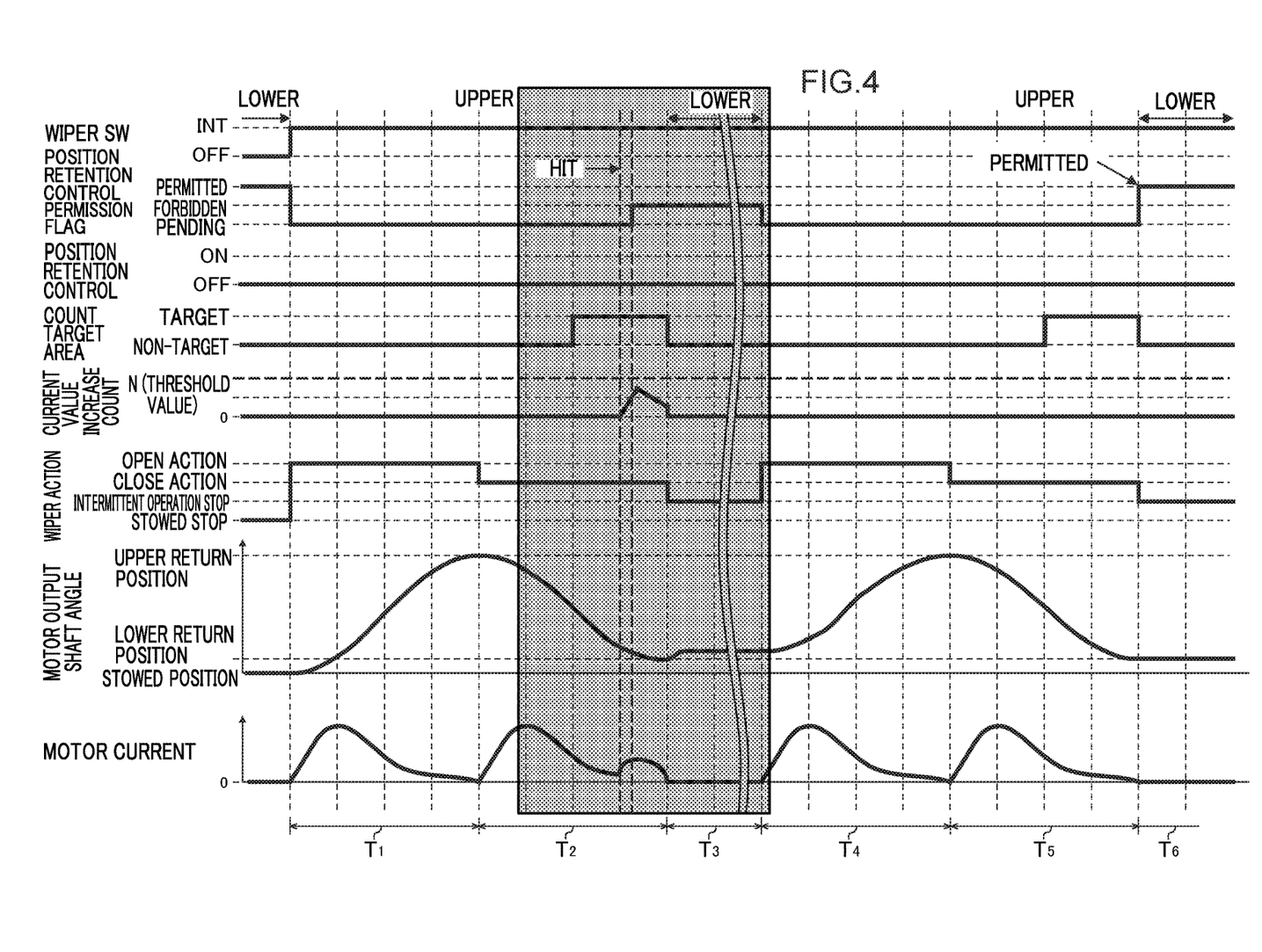
FIG. 4 is a timing chart illustrating an example of operation of a wiper device during intermittent operation in the first exemplary embodiment.

Further explanation follows regarding operation of the intermittent operation processing described above, with reference to FIG. 4 and FIG. 5. As illustrated in FIG. 4, when the contact point of the wiper switch 50 is switched from the stationary position (OFF) to the intermittent operation position (INT), first, during a time period Ti a first outward journey (OPEN action) is performed such that the wiper blades 28, 30 move from the lower return position P2 to the upper return position P1. FIG. 4 illustrates a case in which the wiper blades 28, 30 hit an obstruction during a first return journey (CLOSE action) of the wiper blades 28, 30 from the upper return position P1 toward the lower return position P2 during the next time period T2.

Figure 5:
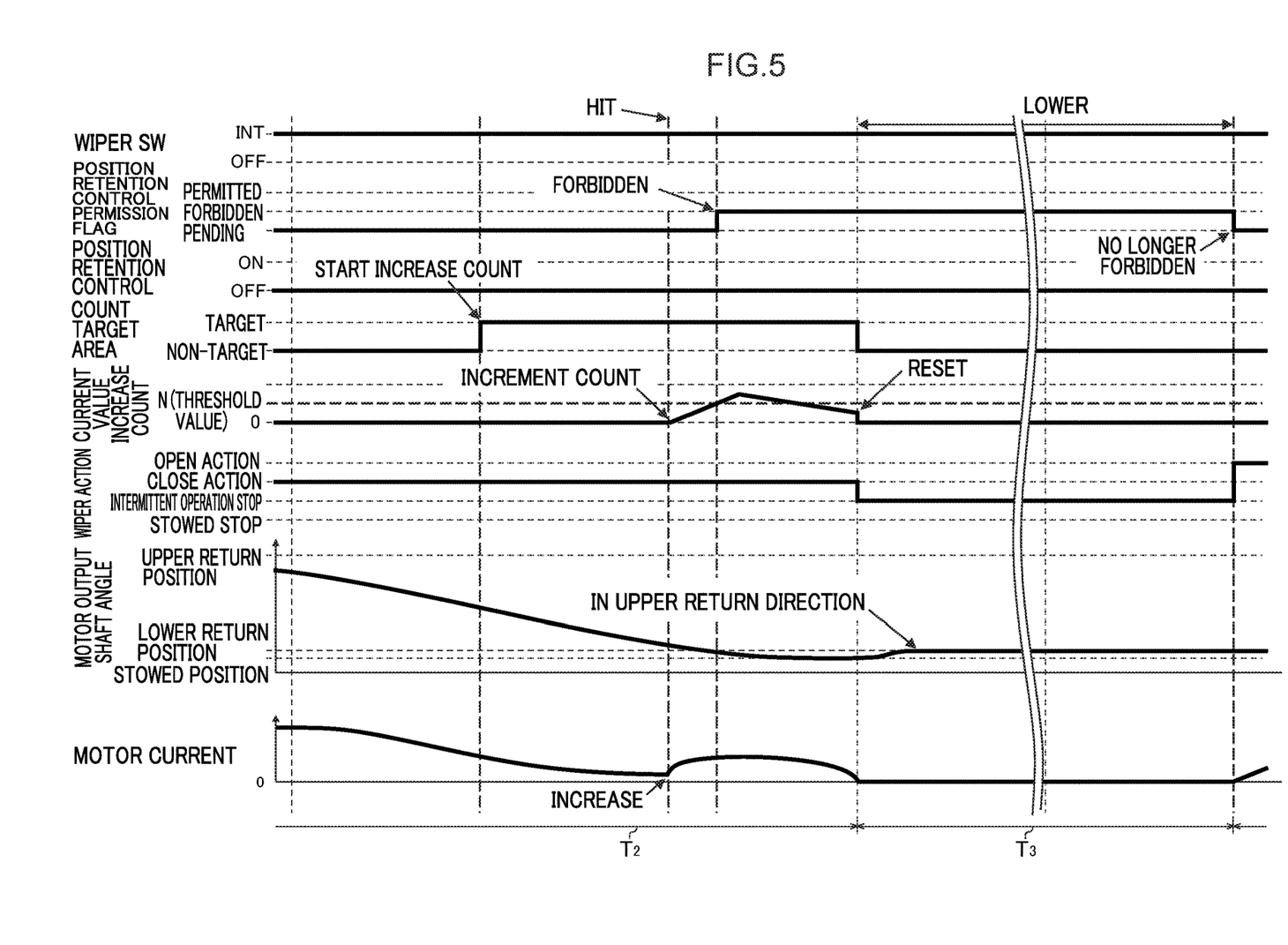
FIG. 5 is an enlarged timing chart illustrating a portion of FIG. 4.

In the example illustrated in FIG. 4 and as illustrated in detail in FIG. 5, during the first return journey the motor current that had been increasing starts to decrease. After the wiper blades 28, 30 have entered the count target area the wiper blades 28, 30 hit the obstruction, and the motor current begins to increase again. The count value starts to be incremented accompanying this increase in the motor current, and at the point in time when the count value reaches or exceeds the threshold value N, the position retention control permission flag is set to "forbidden". In this case, position retention control is not performed during the time period T3 after the wiper blades 28, 30 have arrived at the lower return position P2.

In cases in which the wiper blades 28, 30 hit an obstruction in the count target area during the return journey, the obstruction causes the wiper blades 28, 30 to arrive at the lower return position P2 in a state in which the wiper blades 28, 30, the wiper arms 24, 26, and the link mechanism 20 are flexed. If the position retention control were to be performed in a flexed state of the wiper blades 28, 30, the wiper arms 24, 26, and the link mechanism 20, an excessive load could be placed on the wiper motor 18, causing a large current to flow and potentially leading to premature deterioration or faults in the wiper motor 18. There is also the potential for faults caused by placing excessive load on the wiper blades 28, 30, the wiper arms 24, 26, and the link mechanism 20.

However, in the present exemplary embodiment, in cases in which the count value reaches or exceeds the threshold value N due to an increase in the motor current, the position retention control permission flag is set to "forbidden", which forbids the position retention control. This enables excessive load to be suppressed from being placed on the wiper motor 18, the wiper blades 28, 30, the wiper arms 24, 26, and the link mechanism 20. Moreover, the flexing of the wiper blades 28, 30, the wiper arms 24, 26, and the link mechanism 20 is relieved, as is clear from FIG. 5 in which the wiper blades 28, 30 return somewhat in the upward direction at the beginning of the time period T3.

The example illustrated in FIG. 4 illustrates a case in which the wiper blades 28, 30 do not hit the obstruction on the second return journey during the time period T5. In this case, the increase in the motor current in the count target area is not repeated, and the wiper blades 28, 30 arrive at the lower return position P2 without the count value reaching or exceeding the threshold value N. The position retention control permission flag is accordingly set to "permitted", and the position retention control is performed in the following time period T6.

Second Exemplary Embodiment

Explanation follows regarding a second exemplary embodiment of the present disclosure. Note that portions similar to those of the first exemplary embodiment are allocated the same reference numerals, and explanation thereof is omitted.

Figure 6:
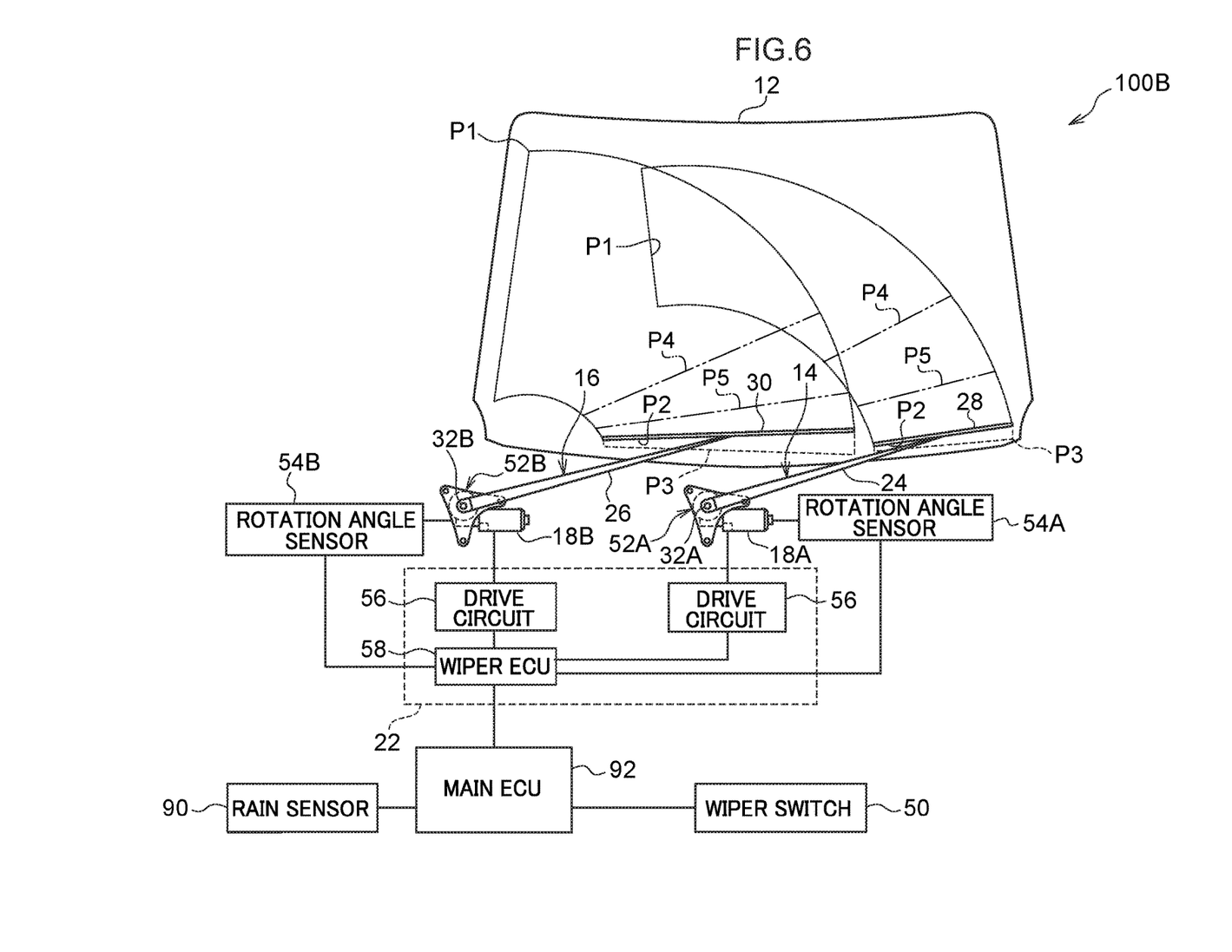
FIG. 6 is a schematic diagram illustrating configuration of a wiper device according to a second exemplary embodiment.

As illustrated in FIG. 6, a wiper device 100B according to the second exemplary embodiment is a direct-driven tandem type wiper device in which a wiper 14 is operated by drive force of a wiper motor 18A, and a wiper 16 is operated by drive force of a wiper motor 18B. A wiper arm 24 of the wiper 14 is pivoted by drive force of the wiper motor 18A slowed and transmitted through a speed reduction mechanism 52A, and a wiper arm 26 of the wiper 16 is pivoted by drive force of the wiper motor 18B slowed and transmitted through a speed reduction mechanism 52B. In the wiper device 100B, the wiper motors 18A, 18B are driven such that the wiper arm 24 of the wiper 14 and the wiper arm 26 of the wiper 16 pivot in the same direction as each other.

The wiper motors 18A, 18B are both connected to a wiper control section 22 that controls drive of the wiper motors 18A, 18B. The wiper control section 22 includes drive circuits 56 (each including a pre-driver 56A and a driver 56B) and a wiper ECU 58. A rotation angle sensor 54A that detects a rotation speed and a rotation angle of an output shaft 32A of the wiper motor 18A, and a rotation angle sensor 54B that detects a rotation speed and a rotation angle of an output shaft 32B of the wiper motor 18B, are connected to the wiper ECU 58.

The wiper ECU 58 computes the respective positions of the wiper blades 28, 30 on the windshield glass 12 based on signals from the rotation angle sensors 54A, 54B. The wiper ECU 58 controls the respective drive circuits 56 (the pre-drivers 56A and the drivers 56B) so as to change the rotation speeds of the output shafts 32A, 32B according to the computed positions. Note that the rotation angle sensors 54A, 54B are respectively provided inside the speed reduction mechanisms 52A, 52B of the wiper motors 18A, 18B, and convert magnetic field (magnetic force) of excitation coils or magnets that rotate coordinated with the output shafts 32A, 32B into a current which is then detected. Control of the rotation speeds of the output shafts 32A, 32B is performed by referencing a speed map, pre-stored in the storage section 58C, in which rotation speeds of the output shafts 32A, 32B are specified according to positions of the wiper blades 28, 30.

Each of the drive circuits 56 (the pre-driver 56A and the driver 56B) has the same configuration as the drive circuit 56 described in the first exemplary embodiment, and so explanation thereof is omitted. When a signal corresponding to the contact point position of a wiper switch 50 is input to the wiper ECU 58, the wiper ECU 58 performs control according to the output signal from the wiper switch 50. To elaborate, the wiper ECU 58 computes rotation speeds for the output shafts 32A, 32B based on a command signal from the wiper switch 50 and the speed map mentioned above. The wiper ECU 58 also controls the drive circuits 56 (the pre-drivers 56A and the drivers 56B) so as to rotate the output shafts 32A, 32B at the computed rotation speeds.

Figure 7:
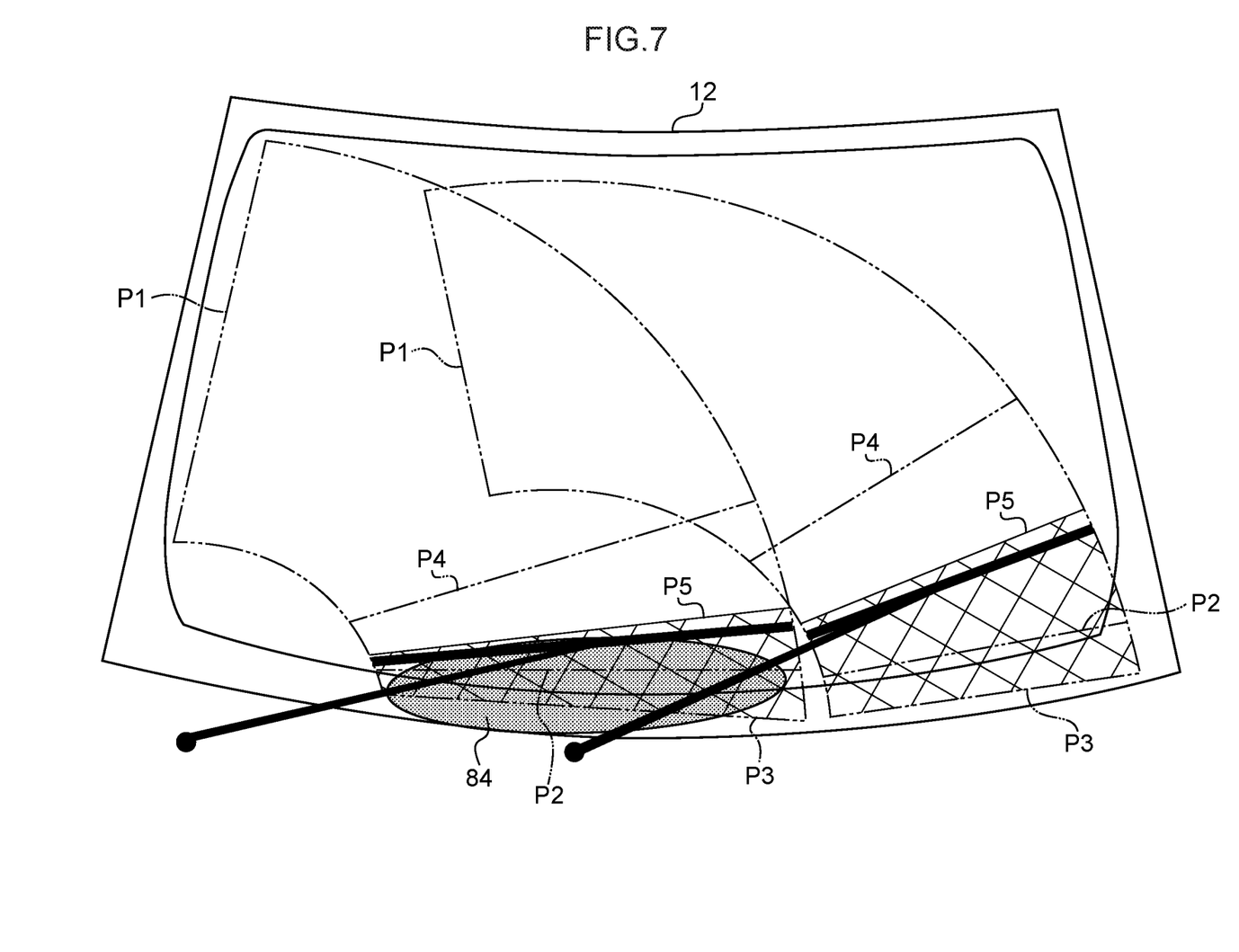
FIG. 7 is a schematic diagram illustrating an accumulated snow detection area overlaid on a wiping range of a wiper.

Explanation follows regarding operation of the second exemplary embodiment, namely detection of accumulated snow performed by the wiper ECU 58 according to the second exemplary embodiment. As illustrated in FIG. 6 and FIG. 7, in the second exemplary embodiment, an upper end position P5 of an accumulated snow detection area is set between the lower return position P2 and the upper end position P4 of the count target area. The accumulated snow detection area is set between the upper end position P5 of the accumulated snow detection area and the stowed position P3. While the wiper blades 28, 30 are moving through the accumulated snow detection area on a return journey (CLOSE action) of the wipers 14, 16, and when the wiper blades 28, 30 move toward the stowed position P3, the wiper ECU 58 performs accumulated snow detection by monitoring whether or not accumulated snow is present, namely whether or not the wiper blades 28, 30 have hit an obstruction such as accumulated snow.

Various detailed methods exist for determining whether or not accumulated snow is present at the wiper blades 28, 30. Although these will not be described in detail herein, one example is a method in which accumulated snow is determined to be present, namely the wiper blades 28, 30 are determined to have hit accumulated snow or the like, in cases in which rotation of at least one out of the output shafts 32A, 32B of the wiper motors 18A, 18B stops as the wiper blades 28, 30 are moving. An example of a significant accumulation of snow in which accumulated snow is determined to be present is illustrated by the reference numeral 84 in FIG. 7. The wiper ECU 58 stops movement of the wiper blades 28, 30 in cases in which accumulated snow has been determined to be present, and performs position retention control to retain the wiper blades 28, 30 at the stopped position within the accumulated snow detection area (the position when the rotation of at least one out of the output shafts 32A, 32B of the wiper motors 18A, 18B has stopped).

Figure 8:
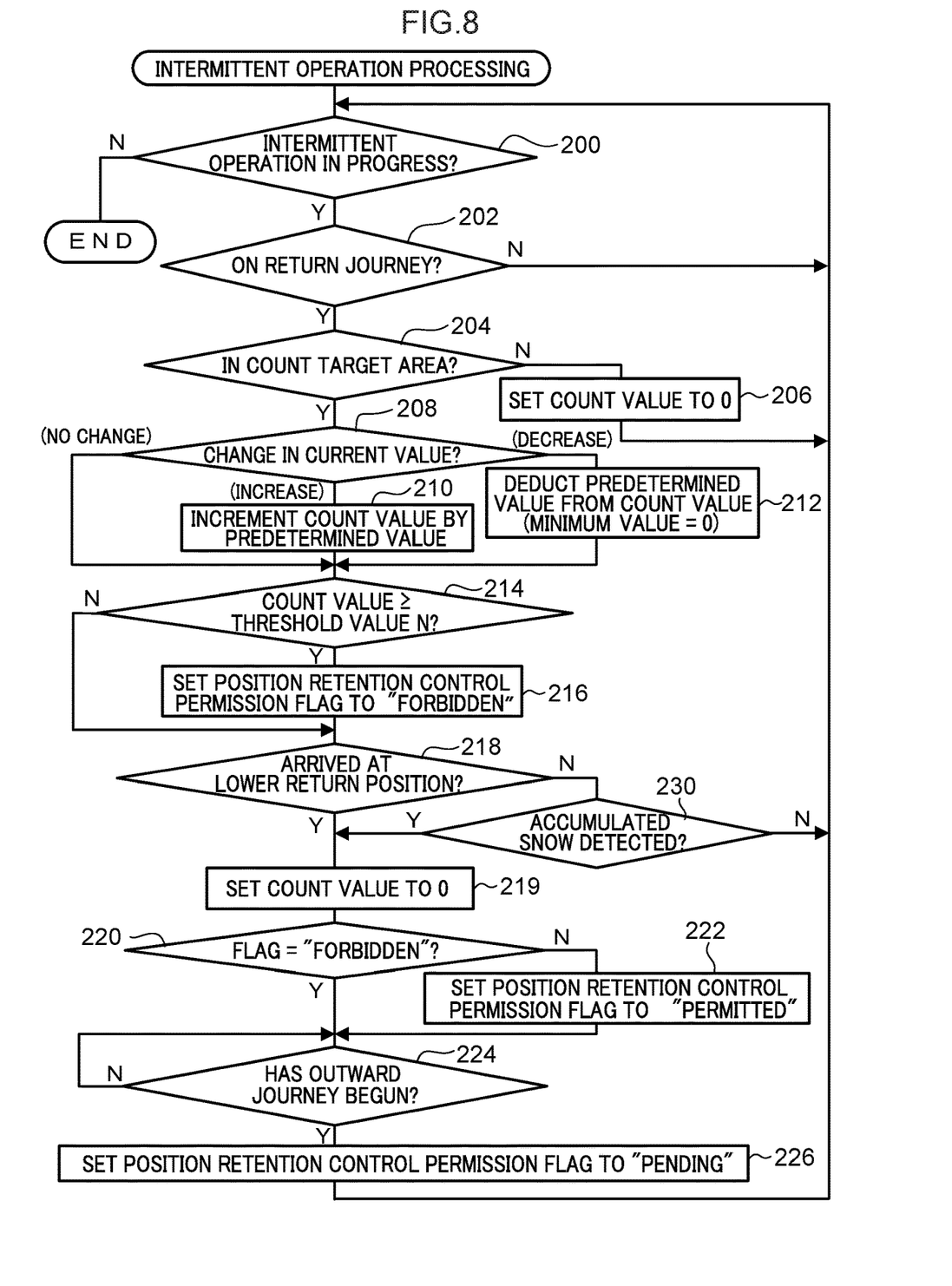
FIG. 8 is a flowchart illustrating an example of intermittent operation processing according to the second exemplary embodiment.

Next, explanation follows regarding intermittent operation processing according to the second exemplary embodiment, with reference to FIG. 8. The intermittent operation processing illustrated in FIG. 8 differs from that of the first exemplary embodiment in that in cases in which determination is negative at step 218, processing transitions to step 230, and determination is made as to whether or not accumulated snow is present, namely determination is made as to whether or not the wiper blades 28, 30 have hit an obstruction such as accumulated snow. In cases in which determination is negative at step 230, processing returns to step 200, and in cases in which determination is affirmative at step 230 processing transitions to step 219.

Figure 9:
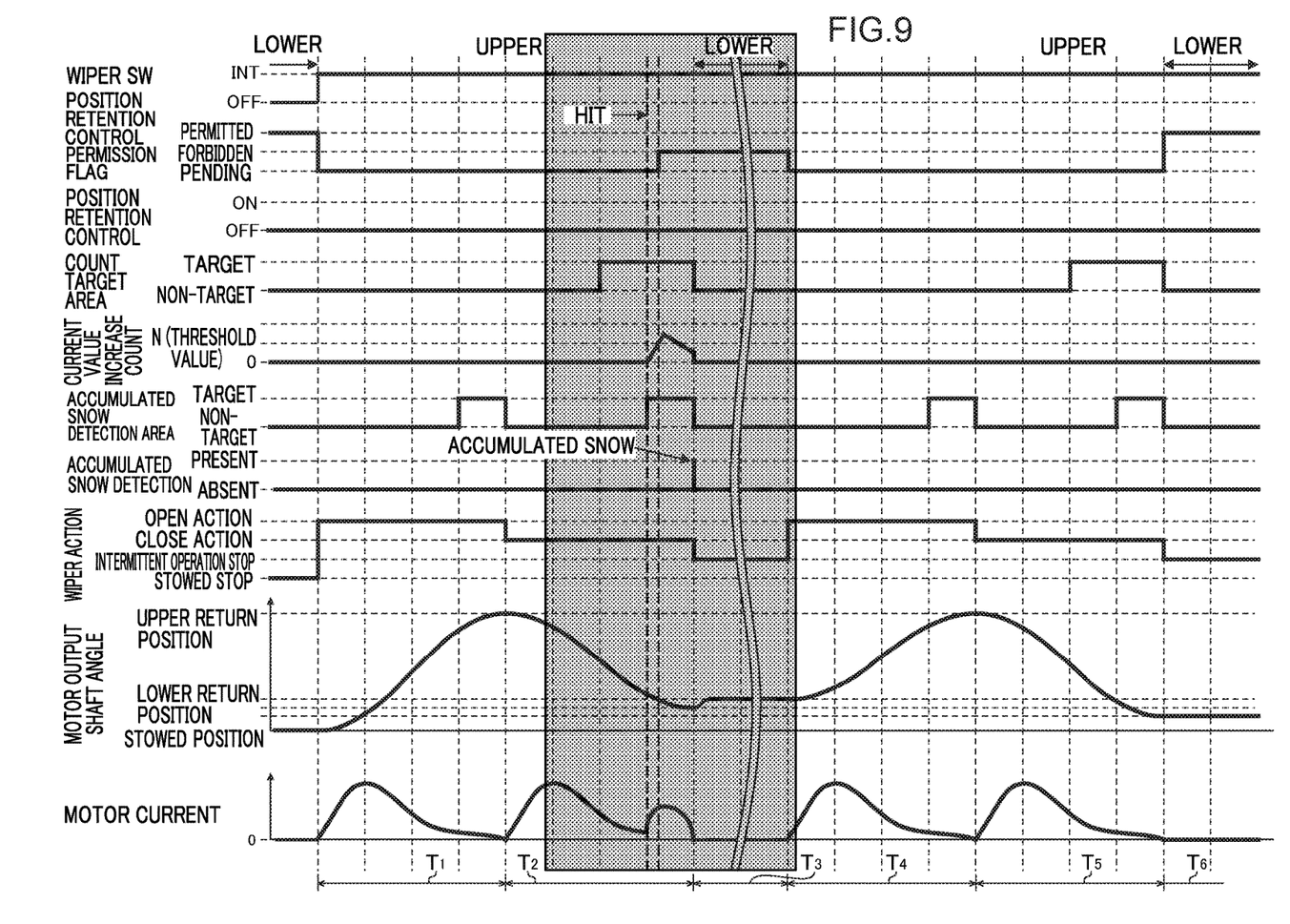
FIG. 9 is a timing chart illustrating an example of operation of a wiper device during intermittent operation in the second exemplary embodiment.

Further explanation follows regarding operation of the intermittent operation processing described above, with reference to FIG. 9 and FIG. 10. FIG. 9 illustrates a case in which the wiper blades 28, 30 hit an obstruction during the first return journey (CLOSE action) of the wiper blades 28, 30 from the upper return position P1 toward the lower return position P2 during the following time period T2, and accumulated snow has been determined to be present.

Figure 10:
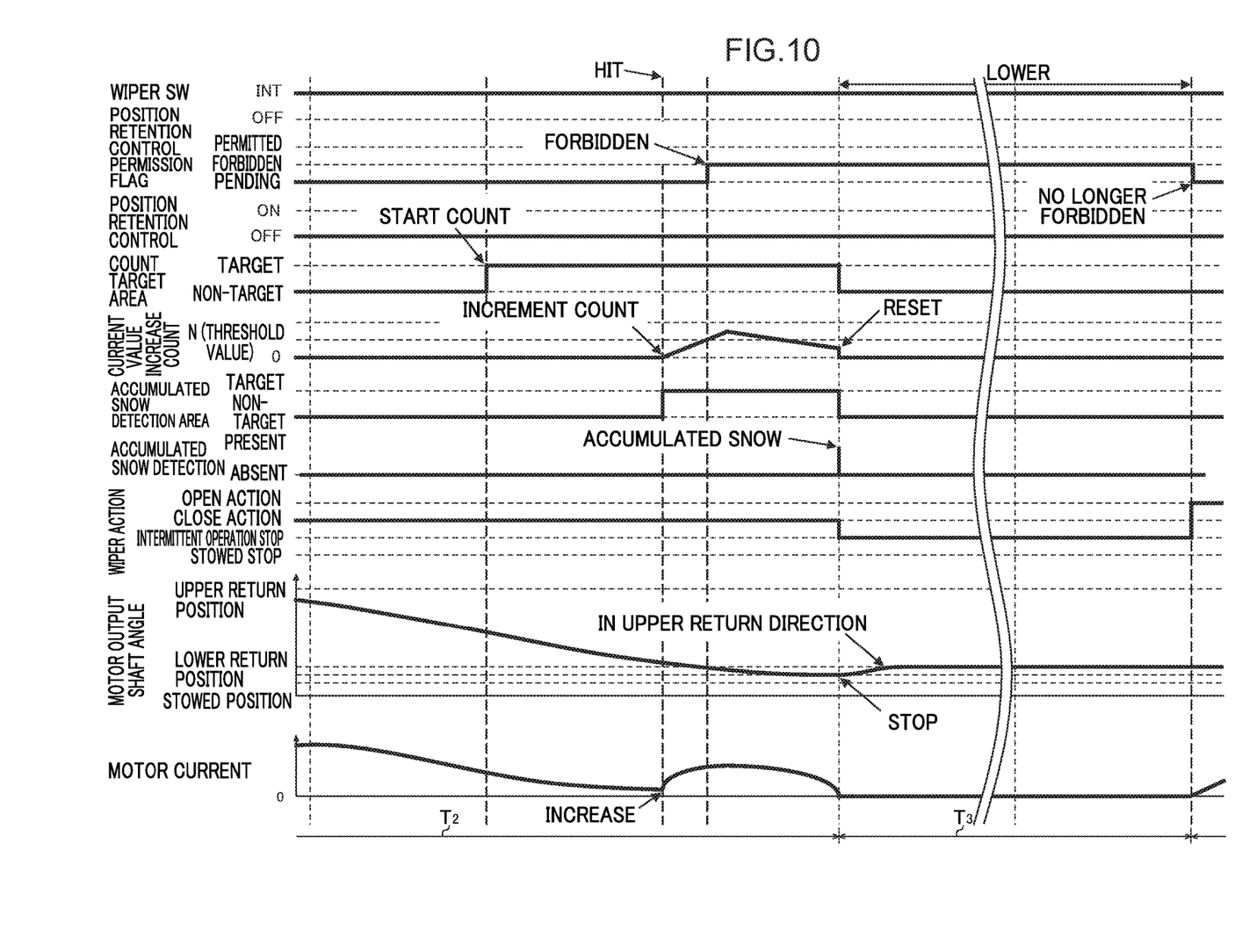
FIG. 10 is an enlarged timing chart illustrating a portion of FIG. 9.

In the example illustrated in FIG. 9 and as illustrated in detail in FIG. 10, during the first return journey the motor current that had been increasing starts to decrease. After the wiper blades 28, 30 have entered the count target area the wiper blades 28, 30 hit the obstruction, and the motor current begins to increase again. The count value starts to be incremented accompanying this increase in the motor current, and at the point in time when the count value reaches or exceeds the threshold value N, the position retention control permission flag is set to "forbidden". After this, accumulated snow is determined to be present within the accumulated snow detection area, and the wiper blades 28, 30 are stopped at positions further toward the upper side than the lower return position P2. Since the position retention control permission flag has already been set to "forbidden" at this point, position retention control is not provided during the time period T3 after the wiper blades 28, 30 have stopped at positions further toward the upper side than the lower return position P2.

After the wiper blades 28, 30 hit the obstruction in the count target area during the return journey, in cases in which accumulated snow has been determined to be present in the accumulated snow detection area, accumulated snow is determined to be present and the obstruction causes movement of the wiper blades 28, 30 to be stopped in a state in which the wiper blades 28, 30, the wiper arms 24, 26, and a link mechanism 20 are flexed. If the position retention control were to be performed in a flexed state of the wiper blades 28, 30, the wiper arms 24, 26, and the link mechanism 20, an excessive load could be placed on the wiper motors 18A, 18B, causing a large current to flow and potentially leading to premature deterioration or faults in the wiper motors 18A, 18B. There is also the potential for faults caused by placing excessive load on the wiper blades 28, 30, the wiper arms 24, 26, and the link mechanism 20.

However, in the second exemplary embodiment, in cases in which the count value reaches or exceeds the threshold value N due to an increase in the motor current, the position retention control permission flag is set to "forbidden", which forbids the position retention control, thereby enabling excessive load to be suppressed from being placed on the wiper motors 18A, 18B, the wiper blades 28, 30, the wiper arms 24, 26, and the link mechanism 20, even in cases in which accumulated snow is then determined to be present and movement of the wiper blades 28, 30 is stopped at a position further toward the upper side than the lower return position P2. Moreover, the flexing of the wiper blades 28, 30, the wiper arms 24, 26, and the link mechanism 20 is relieved, as is clear from FIG. 10 in which the wiper blades 28, 30 return somewhat in the upward direction at the beginning of the time period T3.

Note that although explanation has been given regarding an example in which the wiper device 100B according to the second exemplary embodiment performs accumulated snow detection, the wiper device 100A according to the first exemplary embodiment may also perform accumulated snow detection.

Although explanation has been given regarding an example in which the wiper motor 18 is configured by a brushed DC motor, there is no limitation thereto, and the wiper motor 18 may be configured by a brushless motor.

Although explanation has been given regarding an example in which position retention control is performed at the lower return position as an example of a first return position, there is no limitation thereto, and the present disclosure may also be applied to a wiper device that performs position retention control at an upper return position.

Moreover, in the above exemplary embodiments, although determination as to whether or not intermittent operation is in progress at step 200 is made based on whether or not the wiper switch 50 is at the intermittent operation position, there is no limitation thereto. The intermittent operation may be any operation in which there is a pause of a predetermined duration at a return position (either the lower return position P2 or the upper return position P1). For example, in cases in which the wiper switch 50 is at the automatic operation position and the rain sensor 90 has detected a small amount of rain, there is a pause of a predetermined duration at a return position (either the lower return position P2 or the upper return position P1), and this action may be determined to be an intermittent operation in progress.

An object of the present disclosure is to obtain a wiper device capable of suppressing load placed on the wiper device in cases in which an obstruction is present in the vicinity of a return position where a wiper blade is stopped for a predetermined duration.

A first aspect of the present disclosure is a wiper device that includes: a drive source that generates drive force by being supplied with power; a wiper arm to which drive force of the drive source is transmitted by the wiper arm being coupled with a wiper blade; a first control section that, during intermittent operation, controls power supply to the drive source such that the wiper blade wipes to-and-fro between a first return position and a second return position on a windshield and stops moving for a predetermined duration at the first return position, and that performs position retention control that controls power supply to the drive source such that the stopped wiper blade is retained at a position at which the wiper blade is stopped; and a second control section that suspends the position retention control by the first control section in a case in which a current flowing in the drive source is detected to have increased by a predetermined value or greater while the wiper blade moves toward the first return position within a predetermined region in a vicinity of the first return position.

In the first aspect, during the intermittent operation, the first control section controls power supply to the drive source such that the wiper blade wipes to-and-fro between the first return position and the second return position on the windshield, and stops moving for the predetermined duration at the first return position. Note that if an obstruction is present in the vicinity of the first return position where the wiper blade stops for the predetermined duration, after the wiper blade has hit the obstruction, the wiper blade would move toward the first return position in a state in which the obstruction causes the wiper blade and the wiper arm to be flexed.

To address this, the second control section suspends the position retention control by the first control section in cases in which a current flowing in the drive source is detected to have increased by the predetermined value or greater as the wiper blade moves toward the first return position within the predetermined region in the vicinity of the first return position. Thus, in cases in which an obstruction is present within the predetermined region in the vicinity of the first return position, the fact that the wiper blade has hit the obstruction is detected as an increase in the current flowing in the drive source of the predetermined value or greater.

The second control section suspends the position retention control by the first control section in cases in which the current flowing in the drive source is detected to have increased by the predetermined value or greater. This prevents excessive load from being placed on the wiper device including the drive source as a result of the position retention control being performed in a state in which the obstruction causes the wiper blade and the wiper arm to be flexed. Thus, the first aspect enables load placed on the wiper device to be suppressed in cases in which an obstruction is present in the vicinity of a return position where the wiper blade is stopped for a predetermined duration.

A second aspect of the present disclosure is the wiper device of the first aspect, wherein: the second control section increases a count value each time the current flowing in the drive source is detected to have increased while the wiper blade moves toward the first return position within the predetermined region, and the second control section determines an increase of the predetermined value or greater to have been detected in a case in which the count value becomes equal to or greater than a threshold value. This thereby enables an increase in the current flowing in the drive source of the predetermined value or greater to be precisely detected without being affected by momentary increases in the current flowing in the drive source, or the like.

A third aspect of the present disclosure is the wiper device of the first of the second aspect, wherein: the first control section performs the position retention control at the position at which the wiper blade has been stopped in a case in which the wiper blade has stopped before arriving at the first return position; and in a case in which the current flowing in the drive source is detected to have increased by a predetermined value or greater while the wiper blade moves toward the first return position within the predetermined region in the vicinity of the first return position, the second control section sets instruction information to suspend the position retention control and holds the instruction information until movement of the wiper blade toward the second return position begins.

For example, in cases in which snow has accumulated at the first return position, the wiper blade might stop prior to arriving at the first return position. If the first control section were to perform the position retention control at the stopped position in cases in which the wiper blade had stopped prior to arriving at the first return position, the position retention control would be performed at a position other than the first return position.

To address this, in the third aspect, in cases in which the current flowing in the drive source is detected to have increased by the predetermined value or greater when the wiper blade moves toward the first return position within the predetermined region in the vicinity of the first return position, the second control section sets instruction information to suspend the position retention control, and holds the instruction information until movement of the wiper blade toward the second return position begins. Thus, even if the wiper blade stops prior to arriving at the first return position, the position retention control can be suspended if the current flowing in the drive source is detected beforehand to have increased by the predetermined value or greater.

Moreover, any one of the first aspect to the third aspect may be configured as for example in a fourth aspect, such that the first return position is a lower return position, and the second return position is an upper return position.

What is claimed is:

1. A wiper device comprising:
a motor;
a wiper arm (1) driven by the motor and (2) coupled with a wiper blade; and
a processor that is configured to:
during intermittent operation of the wiper arm, control a power supply to the motor such that the wiper blade wipes to-and-fro between a first return position and a second return position on a windshield and stops moving for a predetermined duration at the first return position, and perform position retention control that controls the power supply to the motor such that the stopped wiper blade is retained at a position at which the wiper blade is stopped; and
suspend the position retention control in a case in which a current flowing in the motor is detected to have increased by a predetermined value or greater while the wiper blade moves toward the first return position within a predetermined region of movement of the wiper blade defined by (1) an intermediate wiper blade position between the second return position and the first return position and (2) the first return position.

2. The wiper device of claim 1, wherein:
the processor is configured to (1) increase a count value each time the current flowing in the motor is detected to have increased while the wiper blade moves toward the first return position within the predetermined region, and (2) determine an increase of the predetermined value or greater to have been detected in a case in which the count value becomes equal to or greater than a threshold value.

3. The wiper device of claim 1, wherein:
the processor is configured to perform the position retention control at the position at which the wiper blade has been stopped in a case in which the wiper blade has stopped before arriving at the first return position; and
in a case in which the current flowing in the motor is detected to have increased by a predetermined value or greater while the wiper blade moves toward the first return position within the predetermined region in the vicinity of the first return position, the processor is configured to set instruction information to suspend the position retention control and holds the instruction information until movement of the wiper blade toward the second return position begins.

4. The wiper device of claim 1, wherein the first return position is a lower return position, and the second return position is an upper return position.

5. The wiper device of claim 1, wherein the predetermined region is a region of movement of the wiper blade in which the current flowing in the motor is set to decrease during normal operation of the wiper device.

* * * * *